US010310106B2

(12) United States Patent
Li et al.

(10) Patent No.: US 10,310,106 B2
(45) Date of Patent: Jun. 4, 2019

(54) DUAL/MULTIPLE-ENERGY X-RAY SENSOR WITH SEPARATION BETWEEN PIXELS AND ACTIVE CIRCUITRY

(71) Applicant: Xscan Imaging, Inc., San Jose, CA (US)

(72) Inventors: Shizu Li, San Jose, CA (US); Linbo Yang, Pleasanton, CA (US); Nguyen Phuoc Luu, San Jose, CA (US); Chinlee Wang, Saratoga, CA (US); Hsin-Fu Tseng, Los Altos, CA (US)

(73) Assignee: X-Scan Imaging Corporation, San Jose, CA (US)

( * ) Notice: Subject to any disclaimer, the term of this patent is extended or adjusted under 35 U.S.C. 154(b) by 412 days.

(21) Appl. No.: 15/332,120

(22) Filed: Oct. 24, 2016

(65) Prior Publication Data

US 2017/0115406 A1 Apr. 27, 2017

Related U.S. Application Data

(60) Provisional application No. 62/285,358, filed on Oct. 24, 2015.

(51) Int. Cl.
*G01T 1/20* (2006.01)
*G01T 1/24* (2006.01)

(52) U.S. Cl.
CPC ............ *G01T 1/242* (2013.01); *G01T 1/2018* (2013.01)

(58) Field of Classification Search
CPC ....... G01T 1/17; G01T 1/2928; G01T 1/2018; G01T 1/242; A61B 6/4233; A61B 6/4241; A61B 6/6482
USPC ................... 250/361 R, 370.09; 378/19, 98.8
See application file for complete search history.

(56) References Cited

U.S. PATENT DOCUMENTS 5,864,146 A *   1/1999  Karellas ................. A61B 6/06
                                                   250/581
2018/0275289 A1*  9/2018  Jacobs ................ G01T 1/1611

* cited by examiner

*Primary Examiner* — David P Porta
*Assistant Examiner* — Meenakshi S Sahu
(74) *Attorney, Agent, or Firm* — Jonathan Kidney

(57) ABSTRACT

A dual/multi-energy x-ray image sensor with stacked two-dimensional pixel arrays. Each pixel in one pixel array has a corresponding "overlaid" pixel in the other pixel array. The pixel arrays are stacked parallel and aligned so that they are nominally normal to the x-ray path, and so that a straight path taken by an x-ray photon from the x-ray source to a pixel in one pixel array will also nominally intersect the corresponding pixel in the other pixel array(s). The energy image sensor provides an x-ray scanning detector system, which has increased signal levels and signal-to-noise ratios over dual- or multi-energy detectors using linear diode arrays, specifically when the pixel arrays are TDI pixel arrays that offer higher sensitivities in high-speed line-scan applications. Signal processing circuitry is placed on a periphery of the pixel arrays and shielded. Dual-to-multiple energy applications can be accomplished by increasing the number of stacked pixel arrays.

20 Claims, 4 Drawing Sheets

DUAL/MULTIPLE-ENERGY X-RAY SENSOR WITH SEPARATION BETWEEN PIXELS AND ACTIVE CIRCUITRY

CROSS-REFERENCE TO RELATED APPLICATION(S)

This application claims the benefit of U.S. Provisional Patent Application No. 62/285,358, filed Oct. 24, 2015, the contents of which are hereby incorporated by reference in its entirety.

FIELD

The present invention pertains generally to the field of solid-state image sensors. More particularly, to a dual-energy (DE) or multiple-energy stacked x-ray sensor.

BACKGROUND

A DE image sensor consists of a high-energy (HE) imaging array that is preferentially sensitive to HE x-ray spectrum and a low-energy (LE) imaging array that is preferentially sensitive to LE x-ray spectrum. DE image sensors discriminate between different materials by operating on the principal that different materials have different x-ray absorption spectra. The x-ray absorption spectrum of a specimen's material is a function of the material's elemental composition and its density. Therefore, the ratios of the average absorption coefficients across a sensor's HE array spectral response and the average absorption coefficients across a sensor's LE array spectral response differ between materials. This difference in the absorption coefficient ratios enables the DE image sensor to discriminate between different materials.

Sensors using metal-oxide-semiconductor (MOS), Complementary MOS and Charge-coupled devices (CCD) are sensitive to and susceptible to radiation damage and are generally not practical for DE x-ray imaging applications. When two-dimensional (2-D) arrays are utilized, to avoid radiation damage, the imaging arrays are usually covered with scintillators and fiber optics, which in turn reduce their sensitivity or compactness. Other approaches have been used, but some tradeoff in performance is generally the result.

As is apparent, there has been a long-standing need in the x-ray sensor community for an elegant solution that provides simplicity in design, high sensitivity and accuracy. In view of the prior art's deficiencies, various systems and methods are elucidated below which address one or more of needs of the field.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a multi-energy x-ray detector is provided, comprising: a plurality of two-dimensional x-ray detecting pixel arrays disposed in a vertically parallel arrangement directly above each other, the arrangement positioning corresponding pixels in the pixel arrays that are vertically parallel to each other to be nominally normal to a straight-line x-ray path emanating from a x-ray source disposed above or below the plurality of pixel arrays; MOS devices for receiving signals from the pixels, the MOS devices disposed on the pixel arrays and positioned away from the pixels; and an x-ray shielding disposed one of the pixel arrays, positioned to shield the MOS devices on all the pixel arrays, wherein each pixel array has a different spectral response.

In another aspect of the disclosed embodiments, the above detector is provided, wherein the MOS devices are positioned at a coincident end portion of the pixel arrays; and/or wherein the pixels contain scintillator material that converts x-ray photons to lower-energy or visible photons that are detectable by photodiodes; and/or wherein the pixels contain photodiodes or photoelements that are resistant to radiation damage; and/or wherein the photodiodes or photoelements and the MOS devices are integrated on a semiconductor chip; and/or wherein the semiconductor chip is a silicon CMOS chip; and/or wherein the MOS devices are CMOS field-effect transistors; and/or wherein the semiconductor chip is designed or processed with radiation hardening; and/or wherein the pixel arrays are comprised of a plurality of smaller separate pixel arrays, the smaller pixel arrays tiled together in a lateral, arced, staggered, or overlapping arrangement to form a full pixel array; and/or wherein the pixel arrays are separated by a filter that attenuates certain energies of x-rays; and/or visible-light optics are not used; and/or wherein the pixels of the pixel arrays are not in a rectangular grid pattern; and/or further comprising a software algorithm to compensate for parallax or misalignment between corresponding pixels; and/or wherein the x-ray shielding is a plurality of x-ray shields; and/or wherein the plurality of pixel arrays are a set of two pixel arrays, wherein one pixel array of the set of pixel arrays is configured to detect higher-energy x-ray photons than another pixel array of the set of pixel arrays, to form a dual-energy x-ray detector.

In yet another aspect of the disclosed embodiments, a method of multi-energy x-ray detecting imaging is provided, comprising: passing x-rays from an x-ray source through a plurality of pixel arrays disposed in a vertically parallel arrangement directly above each other, the arrangement positioning corresponding pixels in the pixel arrays that are vertically parallel to each other to be nominally normal to a straight-line path of the x-rays, wherein each pixel array possesses a different spectral response; converting the x-rays in the pixel arrays to electrical charge signals proportional to the x-ray signals for the corresponding spectral responses; processing electrical charge signals in MOS devices that are also disposed on the plurality of pixel arrays, but shielded from incident x-rays; and combining the electrical charge signals from corresponding pixels in the plurality of pixel arrays to generate a multi-energy image.

Further yet in another aspect of the disclosed embodiments, the above method is provided, wherein the combining the electrical charge signals forms a spectral image; and/or comprising tilling smaller separate pixel arrays together in a lateral, arced, staggered, or overlapping arrangement to form a full pixel array of the plurality of the pixel arrays; and/or further comprising adding a filter between the pixel arrays to attenuate certain energies of x-rays; and/or wherein the plurality of pixel arrays are a set of two pixel arrays, one pixel array of the set of pixel arrays being configured to detect higher-energy x-ray photons than another pixel array of the set of pixel arrays, to generate a dual-energy image.

DETAILED DESCRIPTION

Figure 1:
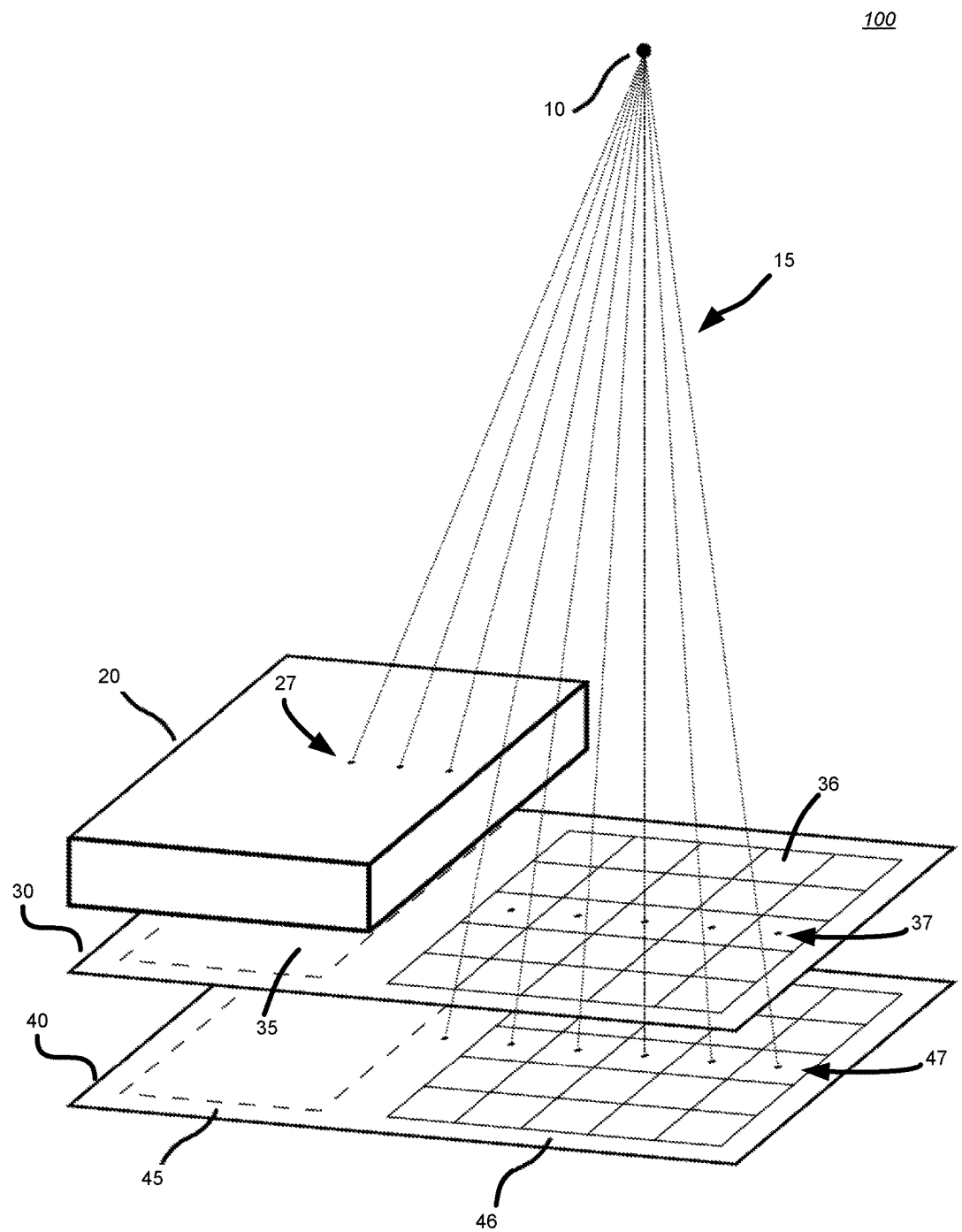
FIG. 1 is an illustration 100 of a dual-energy aspect of an exemplary embodiment.

Key requirements of the DE image sensor are good signal-to-noise ratios (SNR's) to improve image quality and the discrimination between materials, and good registration between HE and LE arrays for accurate identification of the material.

A typical DE image sensor consists of a pair of one-dimensional (1-D) linear-diode arrays (LDA's). The DE LDA image sensors are used to improve material discrimination in applications such as airport baggage security screening, food safety, and food grading inspection.

The HE and LE arrays for the DE LDA image sensors are arranged in a "stacked" configuration where the arrays are parallel and aligned such that the straight-line x-ray path emanating from the x-ray source and intersecting the pixels of the LE array will continue to impinge on the corresponding pixels of the HE array. A filter that preferentially filters out the LE x-rays is sandwiched between the LE and the HE arrays. The LE array typically includes x-ray scintillators that are preferentially sensitive to the LE x-ray spectrum. Likewise, the HE array typically includes x-ray scintillators that are preferentially sensitive to the HE x-ray spectrum.

There are other configurations other than stacked. Another configuration is "side-by-side". In this configuration, the HE and LE arrays are arranged side-by-side. However, this configuration has the disadvantage of poorer registration between HE and LE pixels. Poor registration results from misalignments between HE and LE arrays, specimen movement between HE and LE image captures, and changes in the x-ray angle due to x-ray parallax. With poor registration, the HE and LE signals do not match well and cause the misidentification of materials. Software can be used to compensate for poor registration, but with varying degrees of success and with tradeoffs such as lower image sharpness, resolution, and fidelity.

One variation of the 2-D sensor is the time-delayed integration (TDI) sensor, which increases signal levels in high-speed line-scan applications where the integrated input light signal is very low. In normal line scan application, one way to increase the integrated input light signal is to reduce the scan speed and thus increase the integration time. The TDI sensor allows the line-scan detector system to increase the light signal without sacrificing the scan speed. It is normally implemented using a CCD.

In a CCD TDI array, each detector pixel contains N stages of TDI locations. For example, for an M pixels linear detector, it will contain a 2-D M by N stages CCD array. The N stages CCD for each pixel are arrayed in the direction of scan. The M pixels are arrayed perpendicular to the direction of scan. In operation, the first stage of CCD integrates the light signal within one integration time, which equals to one line time. The signal charge will then transfer from the first stage to the second stage of CCD while the specimen under scan moves from the first stage to the second stage of CCD in synchronization with the movement of the signal charge. The second stage CCD will integrate signal charge during the second integration time for the same specimen. As a result, at the end of the integration time the signal charge at the second stage CCD will be twice the signal charge as compared with the charge it receives from the first stage. The signal charge of the second stage will then move to the third stage in synchronization with the specimen movement. Again, the third stage CCD integrates light signal in addition to the signal it receives from the second stage. The process repeats and when it reaches the final N stage CCD, the light signal is multiplied by N times. An output CCD shift register then reads out the M pixels signal in sequence. As CCD TDI's are very susceptible to x-ray radiation damage, it becomes impractical for the stacked DE image sensor.

In view of the host of arrangements that are possible, multiple problems and shortcomings of some of these arrangements are evident in the art. These shortcomings are often further exacerbated when multiple-energy (multi-energy) x-ray sensors, which can provide spectral images, are added to the DE image sensor.

As described herein, various embodiments are described that include the multi-energy x-ray image sensor and one or more multi-energy x-ray image sensors to overcome issues of both radiation damage and registration. Further, various embodiments for a system and method provide increased signal and lifetimes in DE and multi-energy x-ray systems.

As further detailed below, the sensor is composed of multiple similarly sized pixel arrays arranged in parallel and aligned. All pixel arrays are "nominally" positioned normal to the x-ray linear path from the x-ray source. The arrangement assures good alignment between pixel arrays. As x-ray photons follow a straight line that intersects the x-ray source and corresponding set of pixels in the set of pixel arrays, with appropriate arrangement of the arrays, automatic alignment through "matching" pixels in each array is achieved. As will be evident below, no MOS devices that are susceptible to radiation damage are situated "inside" the pixel area, and are relegated to the shielded portion of the pixel arrays. In a minimal configuration, only two pixel arrays can be used to form a DE x-ray image sensor.

By the proper arrangement of arrays, the relegation of the MOS devices, and with proper shielding, a dual- or multi-energy x-ray sensor can be devised that provides good registration between the corresponding sets of pixels and resistance to radiation degradation. The exemplary design also does not require the extra cost of fiber optics or other optics that are common with x-ray CCD image sensors. It also can be extended to longer pixel arrays by means of tiling smaller pixel arrays. It also may be operated in TDI mode for high-speed line-scanning applications. Furthermore, it is compatible with radiation hardening technology for longer radiation lifetimes.

Applications of x-ray image sensors comprise imaging, medical, veterinarian, dental, security, contraband detection, industrial inspection, product quality, product grading, and product safety applications. An implementation is employable for the detection and conversion of x-rays. However, one skilled in the art will further appreciate that an implementation is employable for the detection and conversion of other electromagnetic energy and high-energy particles, including, but not limited to, gamma-rays and neutrons.

The operating environment of the present disclosure is described with respect to an x-ray system that has the ability to discriminate between materials having like areal densities, but different atomic numbers (Z). However, it will be appreciated by those skilled in the art that the embodiments described herein are equally applicable for use with other spectral x-ray systems.

FIG. 1 is an illustration 100 of a basic configuration of an exemplary embodiment of a DE x-ray image sensor with a pair of pixel arrays, HE 40 and LE 30 arrays in a stacked arrangement. The stacked arrangement provides for good alignment between the HE 40 and LE 30 pixel images, given the X-ray photons travel in straight lines through the stacked arrangement. For example, x-ray 15 emanates from the x-ray source 10 and intersects corresponding pairs of pixels 47, 37 in the HE and LE pixel arrays 40, 30. The x-ray source 10 may, in some embodiments, be "below" the pixel arrays 40, 30. Registration or good alignment is achieved when x-ray 15 intersects or nearly intersects the centers of both pixels 47, 37. This is typically achieved by positioning x-ray source 10 so that x-ray 15 is nominally normal to HE and LE pixel arrays 40, 30. For practical manufacturing reasons, typically HE and LE pixel arrays 40, 30 are flat, so x-ray 15 may not be perfectly normal to pixels 47, 37. Nevertheless, alignment is improved when x-ray source 10 is positioned further away and the HE and LE pixels arrays 40, 30 are sandwiched closer together. The alignment between HE and LE pixels 47, 37 give matched signal measurements of HE and LE x-ray absorption within the x-ray specimen. The matched absorption signals facilitate the determination of the material that best matches the pair of absorption signals and reduces error in that determination.

Furthermore, the pixel elements 36, 46, contain no MOS devices that are susceptible to radiation damage, so that no incident x-rays will impinge on a MOS device without intersecting x-ray shield 20. An x-ray shield 20 is positioned between the x-ray source 10 and any MOS devices designed to receive signals from the pixel elements 36, 46, to intersect any rays 27 that are directed to the MOS devices. All, if any MOS devices 35, 45 are placed at sufficient distance around the periphery of the pixel arrays 30, 40 to facilitate the construction and alignment of the x-ray shield 20. The x-ray shield 20 can be comprised, for example, of a dense, high-Z material that is capable absorbing a large majority of incident x-ray photons through the photoelectric absorption mechanism. It is noted that a single x-ray shield 20 can shield all the MOS devices 35, 45 below it, due to the parallel positioning of the x-ray shield 20 "above" the MOS devices 35, 45.

The pixel elements 36, 46 of the DE image sensor with the basic configuration can be TDI pixel arrays. A TDI pixel array contains a scintillation layer that converts x-ray photons to low-energy or visible photons that can be sensed by silicon photodiodes. The low-energy photons are then captured by a semiconductor photodiode in the TDI pixel. Each TDI pixel has an associated CMOS pixel circuitry in the periphery. While the pixels are located within the pixel arrays and the associated circuitry is located outside the pixel arrays, the TDI pixels and associated circuitry are electrically connected and are organized in TDI stages so signal may be passed from stage to stage synchronous with the movement of the specimen. The photo-generated charge collected by the pixel photodiode is passed to the associated circuitry that performs an integrating amplification function, the noise-reduction function, and the summing with the signal from the previous stage. These functions are performed from stage to stage as a point in the specimen moves from the first stage to the final stage, where the signal goes through final signal processing and output from the sensor.

One advantage of using CMOS circuitry in implementing the TDI detector system is that it can be integrated with all the operating clock generators, signal processing circuitry, and bias generation on a single integrated circuit (IC) chip using standard CMOS process. As a result, it reduces the manufacturing cost. Furthermore, the same IC chip can be used for both HE and LE arrays, leading to the benefits of higher volume manufacturing. It should be appreciated that while FIG. 1 shows the MOS/CMOS devices 35, 45 as being on only one side of the pixel arrays 30, 40, and directly below the shield 20, the MOS/CMOS devices 35, 45 may be in the middle (or other region) of the pixel arrays 30, 40 with accompanying shield 20, wherein the pixels 36, 46 are formed into two or more sets that border the MOS/CMOS devices 35, 45.

Figure 2:
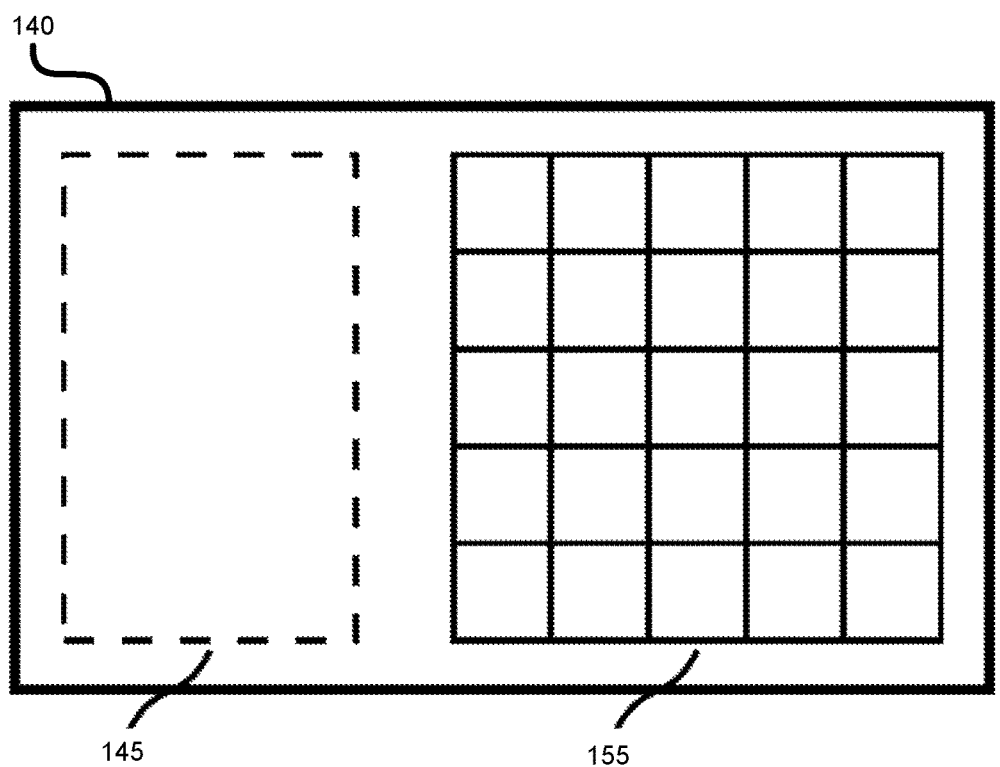
FIG. 2 is an illustration 200 of the top view of a single 2-D pixel array of an exemplary embodiment with its associated MOS devices.

FIG. 2 is a top view 200 of another exemplary embodiment 140 based on the above basic configuration, wherein the pixel arrays are 2-D area arrays 155. The 2-D area arrays 155 are uniformly spaced, rectilinear pixel arrays that are common in both x-ray and visible image sensors. In a single frame, all the pixels in the area arrays are read out, forming full HE and LE 2-D images. The pixels can also include scintillation and silicon photodiodes as in a TDI embodiment, if so desired. The MOS devices 145 around the borders of the pixel area arrays 155 enable the pixel area arrays 155 to be read-out to external devices through an image sensor interface. Typically, these MOS devices 145 include pixel amplifiers. In addition they can include gain amplifiers, noise-cancellation circuitry, signal-chain circuitry, output drivers, timing circuitry with digital scanning shift registers for selecting a series of pixels, and biasing circuitry. Again, since the MOS devices 145 are susceptible to radiation damage, they are shielded from direct incident x-rays from the x-ray source. The silicon photodiode arrays and the MOS circuitry are fabricated in a CMOS process. Of course, other types of semiconductor circuit creation and fabrication techniques in addition to CMOS may be used, according to design preference.

It should be appreciated that the CMOS circuitry of the above embodiments, that utilize standard CMOS processes will generally provide lower manufacturing costs. Also, radiation hardened CMOS processes are widely available, if needed.

The above embodiments involve pixels that may include scintillator and silicon photodiodes and have associated silicon CMOS circuitry. Alternative embodiments may use other semiconductor circuitry without silicon photodiodes or CMOS circuitry. Other alternative embodiments may use photoelements that work with direct x-ray radiation without the need for scintillators. Still other alternative embodiments using radiation-hardened processes may be used.

While the embodiments based on the above basic configuration are illustrated where the pixel arrays are implemented in planar (rectilinear) structures, it should be appreciated that the pixel arrays do not necessarily have to be rectilinear. They can also be circular, linear, or any number of arbitrary shapes. Further, the pixel arrays shown above do not need to contain MOS devices, if so configured, and if they are so configured, the MOS devices and associated circuitry can be disposed on a periphery of the pixel array.

Figure 3:
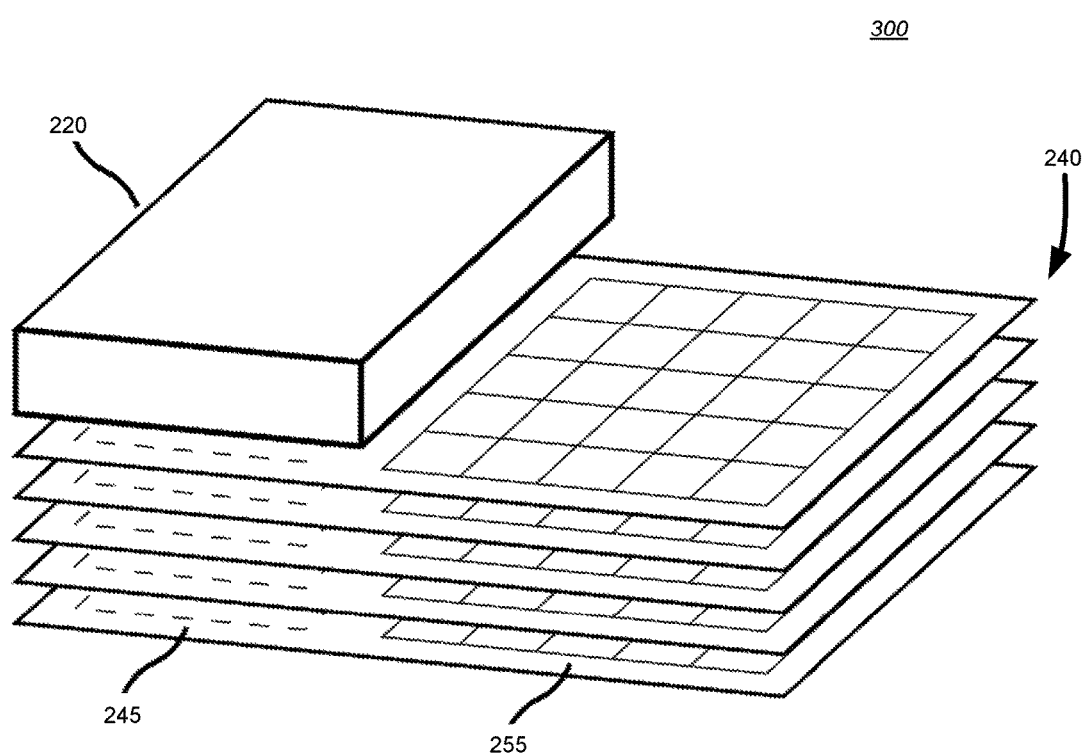
FIG. 3 is an illustration 300 of a multi-energy aspect of exemplary embodiment.

FIG. 3 is an illustration 300 of another embodiment that is an extension of the basic configuration is a multi-energy x-ray image sensor that contains several pixel arrays 240. Each pixel array can be configured to have a different x-ray spectral response. The pixel arrays 240 are arranged in parallel and aligned, like layers in a stack. As in FIG. 1, x-ray photons follow a straight line that intersect the x-ray source and corresponding set of pixels in the set of arrays 240. The alignment between the corresponding set of pixels gives better mapping of the absorption spectrum for the x-ray specimen, hence providing better spectral images. Furthermore, like the basic configuration, the pixel elements 255 contain no MOS devices that are susceptible to radiation damage, and a dense, high-Z x-ray shield is positioned between the x-ray source and any MOS devices 245 that are positioned around the periphery of the pixel arrays 240.

Figure 4:
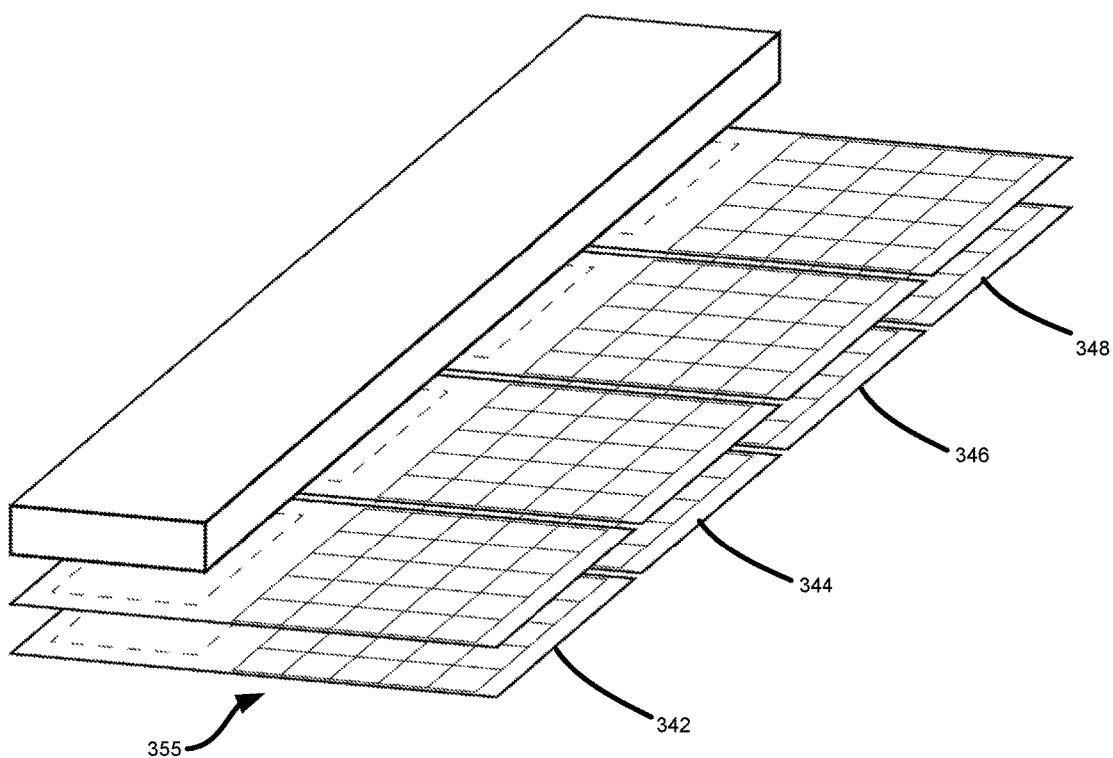
FIG. 4 is an illustration 400 of a tiled aspect of an exemplary embodiment.

In view of the above, various modifications and changes may be made to the exemplary embodiments that are within the spirit and scope of this disclosure. For example, FIG. 4 is an illustration 400 of another stacked embodiment wherein several smaller pixel sub-arrays 342, 344, 346, 348 are be tiled or butted together to create a full pixel array 355. Of course, it would be beneficial, but not necessary, to minimize the gap between tiles to provide a uniform array of pixels. The tiles do not need to be rectilinear in form and they may have different x-ray spectral responses, if so desired. For example, the tiles may form an arc possibly to be centered on the x-ray source to ensure the x-rays are "normal" to each tile. Furthermore, the tiles may be staggered and/or overlapping in various geometries, possibly so that each tile would be "normal" to x-rays. This allows for the "customization" of an x-ray image sensor by appropriate selection of the tiles. Further, smaller pixel arrays are understood to be cheaper than larger arrays.

Also, in some embodiments, the pixel arrays may be separated by a filter that preferentially attenuates certain energies of x-rays. Or, no visible-light optics is used.

The accurate registration of pixels in the above embodiments does not preclude the use of software algorithms that improve the registration between corresponding pixels. Having accurate physical registration improves the performance of software algorithms and reduces the significance of tradeoffs such as loss of image resolution, sharpness, and fidelity.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A multi-energy x-ray detector, comprising:
a plurality of two-dimensional x-ray detecting pixel arrays disposed in a vertically parallel arrangement directly above each other, the arrangement positioning corresponding pixels in the pixel arrays that are vertically parallel to each other to be nominally normal to a straight-line x-ray path emanating from a x-ray source disposed above or below the plurality of pixel arrays;
MOS devices for receiving signals from the pixels, the MOS devices disposed on the pixel arrays and positioned away from the pixels; and
an x-ray shielding disposed one of the pixel arrays, positioned to shield the MOS devices on all the pixel arrays,
wherein each pixel array has a different spectral response.

2. The multi-energy x-ray detector of claim 1, wherein the MOS devices are positioned at a coincident end portion of the pixel arrays.

3. The multi-energy x-ray detector of claim 1, wherein the pixels contain scintillator material that converts x-ray photons to lower-energy or visible photons that are detectable by photodiodes.

4. The multi-energy x-ray detector of claim 1, wherein the pixels contain photodiodes or photoelements that are resistant to radiation damage.

5. The multi-energy x-ray detector of claim 4, wherein the photodiodes or photoelements and the MOS devices are integrated on a semiconductor chip.

6. The multi-energy x-ray detector of claim 5, wherein the semiconductor chip is a silicon CMOS chip.

7. The multi-energy x-ray detector of claim 6, wherein the MOS devices are CMOS field-effect transistors.

8. The multi-energy x-ray detector of claim 5, wherein the semiconductor chip is designed or processed with radiation hardening.

9. The multi-energy x-ray detector of claim 1, wherein the pixel arrays are comprised of a plurality of smaller separate pixel arrays, the smaller pixel arrays tiled together in a lateral, arced, staggered, or overlapping arrangement to form a full pixel array.

10. The multi-energy x-ray detector of claim 1, wherein the pixel arrays are separated by a filter that attenuates certain energies of x-rays.

11. The multi-energy x-ray detector of claim 1, wherein visible-light optics are not used.

12. The multi-energy x-ray detector of claim 1, wherein the pixels of the pixel arrays are not in a rectangular grid pattern.

13. The multi-energy x-ray detector of claim 1, further comprising a software algorithm to compensate for parallax or misalignment between corresponding pixels.

14. The multi-energy x-ray detector of claim 1, wherein the x-ray shielding is a plurality of x-ray shields.

15. The multi-energy x-ray detector of claim 1, wherein the plurality of pixel arrays are a set of two pixel arrays, wherein one pixel array of the set of pixel arrays is configured to detect higher-energy x-ray photons than another pixel array of the set of pixel arrays, to form a dual-energy x-ray detector.

16. A method of multi-energy x-ray detecting imaging, comprising:
passing x-rays from an x-ray source through a plurality of pixel arrays disposed in a vertically parallel arrangement directly above each other, the arrangement positioning corresponding pixels in the pixel arrays that are vertically parallel to each other to be nominally normal to a straight-line path of the x-rays, wherein each pixel array possesses a different spectral response;
converting the x-rays in the pixel arrays to electrical charge signals proportional to the x-ray signals for the corresponding spectral responses;
processing electrical charge signals in MOS devices that are also disposed on the plurality of pixel arrays, but shielded from incident x-rays; and
combining the electrical charge signals from corresponding pixels in the plurality of pixel arrays to generate a multi-energy image.

17. The method of claim 16, wherein the combining the electrical charge signals forms a spectral image.

18. The method of claim 16, further comprising tilling smaller separate pixel arrays together in a lateral, arced, staggered, or overlapping arrangement to form a full pixel array of the plurality of the pixel arrays.

19. The method of claim 16, further comprising adding a filter between the pixel arrays to attenuate certain energies of x-rays.

20. The method of claim 16, wherein the plurality of pixel arrays are a set of two pixel arrays, one pixel array of the set of pixel arrays being configured to detect higher-energy x-ray photons than another pixel array of the set of pixel arrays, to generate a dual-energy image.

* * * * *